April 24, 1956  J. W. MULLEN II  2,742,761
CONTROLLED AREA COMBUSTION RAMJET
Filed July 8, 1949  2 Sheets-Sheet 2
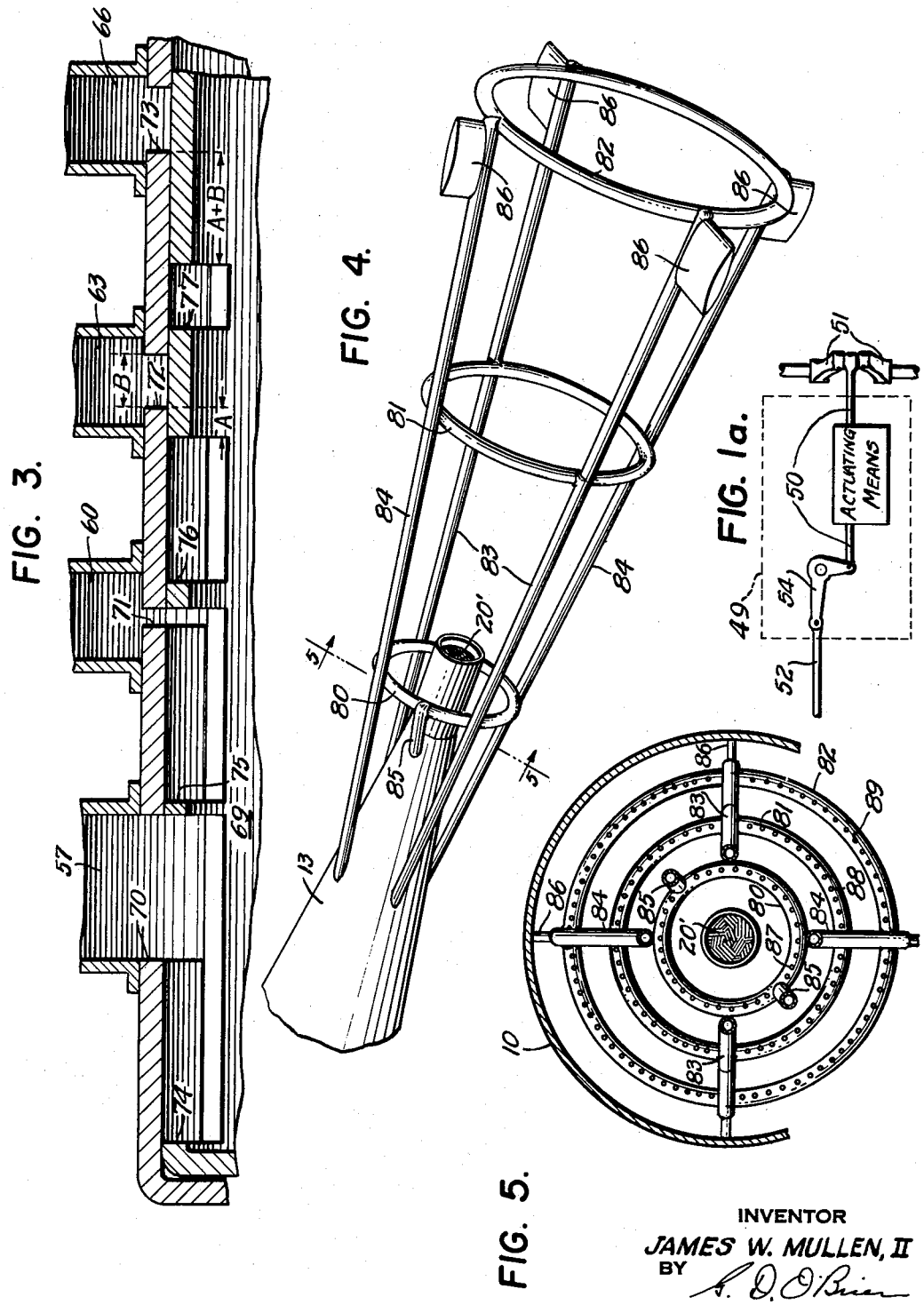
INVENTOR
JAMES W. MULLEN, II
BY
ATTORNEY United States Patent Office 2,742,761
Patented Apr. 24, 1956

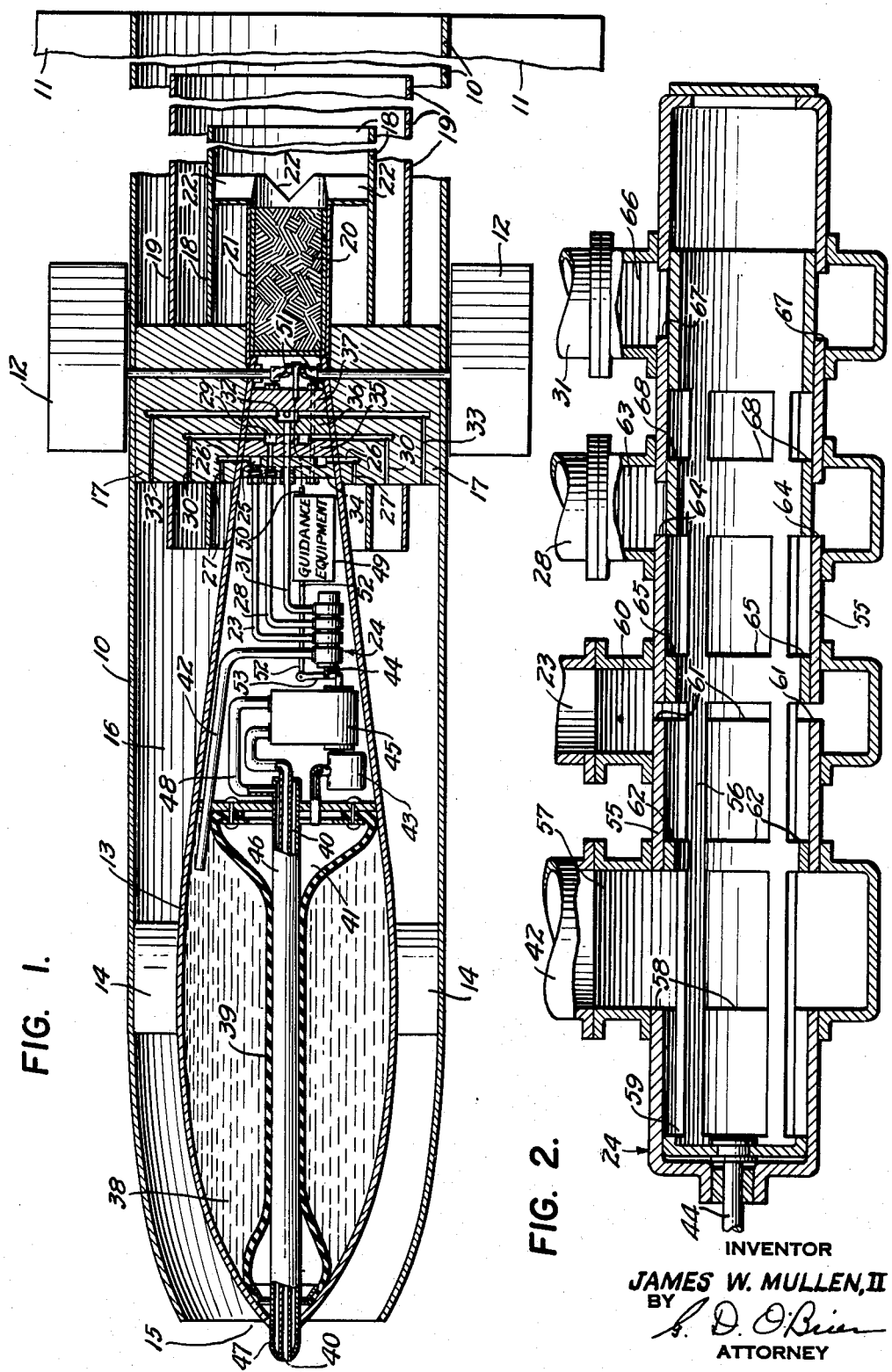

2,742,761

CONTROLLED AREA COMBUSTION FOR RAMJET

James W. Mullen II, Richmond, Va., assignor, by mesne assignments, to the United States of America as represented by the Secretary of the Navy Application July 8, 1949, Serial No. 103,555

3 Claims. (Cl. 60—39.28)

This invention relates to an improved means for controlling combustion in a ram-jet engine.

It is an object to provide an improved means of fuel control for increasing the efficiency of operation of a ram-jet.

It is another object to provide an improved combustion means whereby the life of a ram-jet engine may be prolonged.

It is also an object to provide an improved means for producing a plurality of different desired thrusts in a ram-jet at relatively high combustion efficiency and at a relatively low specific fuel consumption for each of these desired thrusts.

It is a specific object to provide automatic regulating means for carrying out the above objects.

It is a general object to meet the above objects with a relatively simple construction which may readily be adapted to automatic operation and which may not entail prohibitively greater weight to be carried in a ram-jet propelled vehicle.

Other objects and various further features of the invention will be pointed out or will occur to those skilled in the art from a reading of the following specification in conjunction with the accompanying drawings. In said drawings, which show, for illustrative purposes only, preferred forms of the invention:

Fig. 1 is a longitudinal sectional view of a vehicle to be propelled by a ram-jet engine incorporating features of the invention, the rear-end parts being serially broken to permit an enlarged presentation;

Fig. 1a is a fragmentary schematic diagram of certain actuating elements of the vehicle of Fig. 1;

Fig. 2 is a longitudinal sectional view of fuel-metering means suitable for use in the engine of Fig. 1;

Fig. 3 is a fragmentary longitudinal sectional view of an alternative fuel-metering means;

Fig. 4 is a fragmentary perspective view of an alternative fuel-injector means for use in a ram-jet engine, such as the engine of Fig. 1; and Fig. 5 is a sectional view looking downstream in the radial plane 5—5 of Fig. 4.

In present ram-jet engines and in those which have been proposed, combustion may be said always to take place effectively over the entire cross-sectional area of the combustion chamber. In order that vehicles propelled by these engines shall be able to meet the demand for bursts of relatively high thrust, as when executing a turn or when overcoming unforeseen drag, it is necessary that the ram-jet engine shall have been designed normally (i. e., under cruising conditions) to produce a lesser thrust than will be sufficient to overcome the drag normally encountered in cruising flight. The fuel required to produce this lesser thrust may be termed the cruising fuel requirement, in order to produce what may be called a cruising thrust. In well-designed engines, high thrust and high combustion efficiency go hand in hand, so that for the desired lesser or cruising thrust the well-designed present and prior ram-jet engine must operate at a reduced level of combustion efficiency. In terms of specific fuel consumption, that is, in terms of the pounds of fuel consumed per pound of thrust produced per unit of time, the throttled-down or cruising thrust will then be obtained at an unfavorable specific fuel consumption.

In accordance with the invention, means are provided to reduce the specific fuel consumption during the period in which cruising thrusts, and, if desired, decelerating (i. e., or even lesser) thrusts are called for. Briefly stated, this invention contemplates an improved means for controlling the combustion in a ram-jet in such a way as to assure that, for the cross-sectional area over which combustion is substantially completed or is allowed substantially to take place, such combustion may proceed with an air-fuel mixture of a desired effective richness or equivalence ratio; such desired richness or equivalence ratio may produce a high combustion efficiency. Thus, high combustion efficiency, with attendant low specific fuel consumption, may be obtained with my invention whether the engine is operating at a cruising thrust (to produce a given cruising speed), at a decelerating thrust (as when necessary to lose altitude or to slow down to the cruising speed), or at an accelerating thrust (as when necessary to negotiate a turn or other flight maneuver).

In the forms to be described, relatively high combustion efficiencies are made possible for a plurality of different selected thrusts by localizing the effective cross-sectional areas over which combustion is allowed to take place and by causing the combustion in said localized area or areas to take place at relatively high efficiencies. In one form to be described, shrouds are employed one within another and all within the combustion chamber so as to define a plurality of localized areas of circular and annular cross-sectional configuration, all said areas being separated from each other and each being designed to entrain a given desired fraction of the total air flow in the engine. Separate fuel-injection means may be provided for each of these separate or localized cross-sectional areas, and the fuel-injector means may in each case be appropriately designed to provide a mixture of the desired richness or equivalence ratio. A single igniter or flame-holder means may be employed to sustain combustion in all of the various localized cross-sectional areas; and in the event of utilizing all the localized areas (i. e., the entire cross-sectional area of the combustion chamber), a maximum thrust will be produced. During cruising, however, such maximum thrusts will not be needed, and metering means are provided for cutting out the supply of fuel to one of the cross-sectional areas without substantially affecting the rate of fuel flow to the other cross-sectional areas. In this way, high-efficiency combustion may be allowed to take place in the areas which are supplied with fuel, but because the areas supplied with fuel are now less than the total area of the combustion chamber, a lesser thrust (e. g. a cruising thrust) will be obtained. In a similar manner, the metering means may cut out the supply of fuel to a second injection means, so as further to reduce the thrust, if need be.

In the other form to be described, substantially the same effect as above described is obtained but without utilizing shrouds or the like to isolate the air flow. In this other form, the isolation or localizing of the air flow is effectively obtained by a system for localized injection of fuel. In accordance with this system, a first fuel injector is effective to inject fuel effectively into a first fractional area of the combustion-chamber cross-section, and a second fuel injector similarly injects fuel effectively into a second fraction of the cross-sectional area of the combustion chamber. Likewise, a third fuel injector may control injection of fuel effectively into a third fractional area. The metering means for controlling the successive supply of fuel to the various fuel injectors may be essentially the same as that employed for the shrouded construction of the first form to be described.

Referring to Figs. 1 and 2 of the drawings, this invention is shown in application to a vehicle to be propelled by a ram-jet engine. The vehicle may include a generally tubular body 10, with tail fins 11 and with controllable stub wings 12. The ram-jet engine shown is of the so-called inner-body type wherein a central-body casing 13 is supported by radial struts 14 in spaced relation with the inner wall of the body 10. There is thus defined between the inner body 13 and the outer body 10 a through passage for the conduct of air scooped in at the inlet 15 and compressed in a diffuser section 16.

The tail end of the inner body 13 may define the base or downstream end of the diffuser 16 and the upstream end of the combusion chamber. This tail end of the inner body 13 may be rigidly supported within the combustion chamber by means of radially directed and preferably streamlined struts 17.

In accordance with the invention, a localized system of fuel injection and fuel mixing is utilized which may be effective at the upstream end of the combusion chamber, and in the form shown such localized mixing is allowed to take place within well-defined zones. These zones may be defined between a plurality of concentric shrouds 18—19, which may be supported by the struts 17 and which are open at both ends. It will be appreciated that the effect of the shrouds 18—19 at their upstream ends may be to subdivide the total flow of air into the combustion chamber and thus effectively to subdivide the total cross-sectional area of the combustion chamber. Shroud constructions of this general nature are more fully described in a copending application, Serial No. 665,878, filed April 29, 1946, now Patent No. 2,528,096.

As disclosed in said copending application, igniter means in the form of a centrally located flare 20 may be supported at the upstream end of the shrouds 18—19, and in the form shown the casing 21 in which the flare 20 is inserted is formed as a part of the inner body 13. The mouth of the flare 20, that is, the downstream end thereof, may open to a plurality of radially directed V-shaped gutters 22 in order to provide localized turbulent zones for flame holding and in order to assure constant burning within the inner shroud 18.

Fuel injection into the various zones localized by shrouds 18—19 is preferably accomplished by completely separate fuel injectors. These injectors may, in the case of the inner zone within shroud 18, comprise a pipe 23 connected to fuel-metering means 24 and to a distribution manifold 25 in the tail of the inner body 13. The manifold 25 may communicate with drilled radial holes 26 in the struts 17, and injection may be accomplished through upstream-directed nozzles or openings 27 in the struts 17. In a similar manner, a separate supply of fuel may utilize another pipe 28 connected to the fuel-metering means 24 and to a manifold 29 to distribute fuel radially outwardly in the struts 17 for discharge through nozzles 30 into the intermediate combustion zone, between shrouds 18—19. Likewise, a separate pipe 31 may conduct metered fuel to a manifold 32 for radial distribution to discharge orifices 33 for the outer combustion zone, between shroud 19 and the inner wall of the combustion chamber.

In the form shown, the various manifolds 25—29—32 and the axial and radial passages communicating therewith are formed as drilled holes and as grooves in a plurality of plates 34—35—36—37, sandwiched together and held, as by tie-bolts. The remaining parts of the fuel system may include an annular fuel tank 38 having a collapsible flexible liner 39. The air space 41 over the annular fuel bag 39 may be pressurized by a bottle 43 of compressed gas, such as nitrogen, and pressurized fuel may be introduced via the pipe 42 to the fuel-metering means 24.

In order to simplify the present discussion, it is assumed that flight is to take place within relatively confined altitude limits, between which the speed of sound does not vary greatly. This invention is concerned with maintaining relatively high combustion efficiency over substantially the entire area in which combustion is localized. Of course, to produce such high efficiency the fuel flow to a particular zone of combustion must be controlled proportionally to the particular air-weight flow in the engine, and this air flow will vary with altitude, for any given flight Mach number. Fuel-metering devices have been made and described for performing the necessary altitude corrections in fuel flow for constant Mach number, and it will be understood that such existing means may be employed in conjunction with the present ram-jet engine, although, for simplicity, such altitude-correction means is not shown.

The metering means 24 may be actuated in a number of ways to control the supply of fuel to the various combustion zones in order to produce cruising thrust, or accelerating or decelerating thrust, as required. If a roughly constant Mach-number control is desired, the stem 44 for the metering valve 24 may be directly actuated by a pressure-responsive means 45 responding differentially to stagnation pressure and to static pressure. In the form shown, stagnation pressure is available from a Pitot tube 40, which may project into the free air ahead of the vehicle and communicate with the pressure-responsive means 45. Static pressure may be derived from a tube 46 concentric with the Pitot tube 40 and having static-pressure openings 47 located preferably ahead of the vehicle. The static pressure available in the space between the Pitot tube 40 and the other tube 46 may be applied by a pipe 48 to the pressure-responsive means 45. The metering-valve stem 44 may thus be positioned in accordance with differential-pressure control, as for a constant Mach number.

Alternatively, the metering valve 24 may be operated to produce the desired thrust variations in accordance with certain demands of guidance equipment 49 carried on the vehicle. In the form shown, the guidance equipment 49 (see also Fig. 1a) includes actuating means including a rod 50 to drive actuating cranks 51 for controlling the setting of wings 12. The guidance equipment 49 may also include a valve-control rod 52 to produce an actuation of the valve stem 44 in a thrust-producing direction for each actuation of the wings 12 away from a given minimum or mean angle-of-attack setting, as by connecting the rods 50—52 via a bell crank 54, the bell crank 54 being actuated to one side or the other of dead center (with respect to rod 52) for each wing setting displaced from the mean. Thus, if the guidance equipment 49 demands a given angle of attack for the wings 12, a turn may be called for, and added thrust will be needed in order to maintain the desired speed in the course of such turn. The valve-actuating rod 52 of the guidance equipment 49 will then be understood to provide a control means for the valve 24 that will anticipate the need for a change in thrust, so as to provide such thrust change with a minimum lag or response time.

It will be understood that for certain applications either a pressure-responsive control (such as the means 45) alone, or a guidance-type control (as at 49) alone may suffice for control of the metering valve 24. In the form shown, however, both control means are effective simultaneously in determining the setting of the metering valve 24, and a whiffletree connection is shown for differentially combining the guidance-responsive means and the pressure responsive means in order to control the valve 24 appropriately. Both the pressure-responsive means 45 and the guidance equipment 49 will thus be understood separately or in combination to constitute means for anticipating the thrust needs of the vehicle, in order to perform as desired.

In Fig. 2 there is shown more or less schematically a layout for the valve 24 so as to produce the above-described effects. The valve 24 will be seen to comprise essentially a cylindrical housing 55 within which a selector piston 56 is longitudinally displaceable. The piston 56 may be tied to the valve stem 44 and actuated differentially, as described above. Essentially, the valve 24 may include an inlet manifold 57 extending annularly about a relatively wide (longitudinally) opening or openings 58 in the outer cylinder of the valve 24. The manifold 57 may be supplied by the inlet pipe 42, and for all possible positions of the valve piston 56 the manifold 57 may freely communicate with the inside of piston 56, as through a longitudinally extensive opening or openings 59.

For the relationship of parts shown in Fig. 2, the selector piston 56 may supply fuel only to a manifold 60 for the pipe 23, which, it will be recalled, supplies fuel essentially only to the injector means 27 for the inner zone of combustion. Since the area of this inner zone is relatively small compared with the areas of the intermediate and outer zones of combustion, the amount of fuel required to maintain a given desired richness or equivalence ratio in the central zone is relatively small. The opening or openings 61 in the valve cylinder 55 for the manifold 60 are thus of relatively short axial extent, as shown. Since it is preferred that, for all positions of the selector piston 56, this richness or equivalence ratio be maintained within the inner zone of combustion, the opening or openings 62 in the selector piston 56 for the inner zone are of sufficient axial extent to permit substantially a constant rate of fuel injection into the inner zone more or less regardless of the valve setting.

As explained above, the valve 24 is shown in Fig. 2 to be positioned only for fuel injection into the inner zone of combustion. The selector piston 56 is, therefore, effective (for the position of Fig. 2) to prevent any substantial fuel flow into the outer zones of combustion. However, at cruising speed the pressure-responsive means 45 will be understood to call for a different placement of the selector piston 56 than that shown in Fig. 2; with proper design, the cruising speed (or, rather, the thrust required to maintain flight at the cruising Mach number) will be maintained when the selector piston 56 passes a desired full flow of fuel to the manifold 63 for the pipe 28 to the fuel injector 30 for the intermediate zone of combustion. Since the intermediate zone of combustion is of a larger total cross-sectional area than that of the inner zone, the weight flow of air in the intermediate zone will be greater than that in the inner zone, for any given flow at the inlet 15. Thus, to maintain the desired richness or equivalence ratio in the intermediate zone a larger port or ports 64 must be provided in the metering valve to serve the intermediate zone. An opening or openings 65 in the selector piston 56 may serve the ports 64 for the intermediate zone, and the openings 65 may be effective to pass fuel to the intermediate zone immediately upon displacement of the selector piston 56 away (to the right in the sense of Fig. 2) from the position shown in Fig. 2. It is preferred that the openings 65 shall be sufficiently extensive (longitudinally) to provide flow of fuel to the intermediate zone for all positions of the selector piston 56 that are to the right of the one shown in Fig. 2. Thus, the opening 65 is relatively wide (longitudinally) compared with the port 64, and it will be understood that, once opening 65 has fully cleared the full width of the port 64, the desired richness or equivalence ratio may be maintained in the mixture in the intermediate zone, regardless of further displacement (to the right) of the selector piston 56.

The last or outer zone of combustion may be served by a manifold 66 connected to the pipe 31 for the injector means 33 in the outer zone, and, since the cross-sectional area of the outer zone is shown as being the largest of all, the port or ports 67 determining fuel flow to the outer zone may be larger than either of the ports 61—64. Again, for the express purpose of supplying fuel to the outer zone substantially only when the rate of such supply shall be effective to produce the desired richness or equivalence ratio in the mixture in the outer zone, it is preferred that the opening or openings 68 in the piston 56 for cooperating with ports 67 shall not provide any substantial flow to the outer zone of combustion until the fuel flow to the intermediate zone via ports 64 shall have been brought up to the desired rate for efficient combustion in the intermediate zone. Thus, the openings 68 be of substantially the same effective width (longitudinally) as the ports 67.

With the valve 24 as described in connection with Fig. 2, it will be clear that pressurized fuel introduced through the inlet opening 58 may always be available within the selector piston 56 and that fuel may always be supplied at a rate calculated to produce the desired richness or equivalence ratio of efficient combustion in the inner zone of combustion. For subsequent displacements of the selector piston in the direction demanding greater thrust, the flow of fuel will first be brought up to a rate sufficient to produce the desired efficient richness or equivalence ratio in the intermediate zone of combustion; and, as soon as such efficient combustion has been achieved in the intermediate zone, further displacements of piston 56 may serve, not to enrich either the inner zone or the intermediate zone, but rather only to introduce fuel into the outer zone of combustion. At no time, even with the selector piston open all the way (i. e. displaced to the extreme right in Fig. 2), need there be such enrichment of the mixture in any zone of combustion as to produce inefficient combustion.

It will, of course, be understood that, if desired, for additional (yet relatively inefficient, from the point of view of specific fuel consumption) bursts of thrust, additional means (not shown) may be provided for the still further enrichment of the various zones of combustion. However, as indicated, this invention is concerned primarily with economy of operation at substantially an optimum combustion efficiency or optimum specific fuel consumption, and it will be clear that my metering valve 24 may never produce enrichment of any zone of combustion beyond that required for economy of operation within any particular zone of combustion.

In Fig. 3, there is shown a modified valve construction suitable for use in place of the valve 24 which has been described. Since the valve 24 effectively opened ports for flow of fuel to another zone of combustion as soon as the previous zone had been served to the desired extent, the valve of Fig. 2 may be termed a continuously operating valve; in other words, for any movement of piston 56 is an opening direction additional fuel is always being supplied to the combustion chamber. On the other hand, the valve of Fig. 3 may be termed an intermittently operating valve, wherein movements of the selector piston 69 are not always necessarily accompanied by flow changes in the fuel supplied for combustion. In the valve of Fig. 3, the inlet manifold 57 and the three outlet manifolds 60—63—66 will be recognized, for service of three zones of combustion. Also, the selector piston 69 may be employed to cooperate with valve ports 70—71—72—73 in a manner generally similar to that already described in connection with Fig. 2.

In the selector piston 69, the inlet opening 74 may be relatively extensive (longitudinally) in order to assure a full availability of pressurized fuel within the selector piston 69. Also, a relatively extensive opening 75 in the selector piston 69 may always assure sufficient flow of fuel through port 71 to the inner zone of combustion, in order always to produce a mixture of substantially the desired richness or equivalence ratio in the inner zone of combustion. Departing from the arrangement of Fig. 2, the valve of Fig. 3 provides an opening or openings 76, which will not serve the port 72 until a given "idle" displacement A of the selector piston 69 has occurred. Once the opening 76, however, has begun to cross the port 72 so as to introduce fuel into the intermediate zone of combustion, it is preferred that the openings 76 shall continue the supply of fuel to the intermediate zone for all subsequent movements to the right of the selector piston 69. It is also preferred that the opening 76 shall be of sufficient width (longitudinally) to assure a mixture of the desired richness or equivalence ratio in the intermediate zone, once the ports 72 have been fully opened, and for all subsequent movements to the right of the selector piston 69. Once the ports 72 have been fully opened, there is provided in Fig. 3 for another "idle" displacement of the selector piston 69 before the openings 77 may be effective to pass fuel through ports 73 for supplying the outer zone of combustion. If the effective width of the ports 72 may be designated as B, then the effective clearance between the opening 77 and the ports 73 may be $A+B$, as shown, in order to produce such "idle" displacement.

It will be seen that with a valve such as the valve of Fig. 3, some delay is introduced in the mechanism for determining the conditions under which fuel will be passed to successively larger zones of combustion and, conversely, for determining the conditions under which the supply of fuel will be cut out from successive zones of combustion. Such delay (or intermittent operation) may in certain cases be useful in order to reduce hunting effects of the piston 69 and in order to assure that for a given total displacement of the selector piston 69 fuel will be admitted to the successive zones of combustion at a rate producing a desired richness or equivalence ratio with a lesser proportionate displacement past any one of the ports 72—73. This effect of serving the various combustion zones with mixtures at the desired richness or equivalence ratio for greater fractions of the total displacement of selector valve 69 will increase, the larger the "idle" displacement A is made in comparison with the effective width of the ports 72. With the dimension A large compared with the dimension B, it will be clear that if any particular combustion zone is served at all by the valve of Fig. 3, then the mixture in such combustion zone may always be served substantially only at a rate producing the desired richness or equivalence ratio in such zone.

In Figs. 4 and 5, there is shown a modified construction which may utilize the thrust-anticipating means 45—49 and the metering-valve means of Figs. 2 or 3. In Figs. 4 and 5, no shrouds are employed to segregate various fractions of effective cross-section of the combustion chamber; instead, in Figs. 4 and 5 is selectively introduced fuel effectively into various local fractional areas of the combustion chamber.

The structure of Figs. 4 and 5 may include a cascaded assembly of fuel-injection rings or manifolds 80—81—82, supplied by a plurality of fuel pipes 83—84—85 and supported in coaxial longitudinally spaced relation by said pipes. The pipes 83—84—85 may all be connected (within the inner body 13) to suitable manifolding and fuel-distribution means generally similar to that which has been described in connection with Fig. 1. The inner body 13 may also support a flare 20' in order to initiate and to sustain a center of ignition. The downstream end of the assembly of pipes and tubes may be supported by streamlined struts 86, brazed or otherwise fastened to the tubes 83—84 and riding the inner wall of the combustion chamber.

In the form shown, the fuel-injection assembly includes two pipes serving each ring 80—81—82. The pipes 85 provide some support for the inner ring 80 and also supply the ring 80, as a manifold for the valve openings 87 therein. The longitudinally extending pipes 84 may be brazed or spot-welded to each of the successive rings 80—81—82 for support purposes, and at the same time the ends of the pipes 84 may communicate with the ring 82 in order to supply the ring 82 as a manifold for the injection openings 89. The pipes 83 may serve the ring 81 as a manifold and may be brazed or welded to all the rings for rigid support purposes.

Each of the fuel-injector rings 80—81—82 may be drilled with injector openings facing upstream, as indicated in Fig. 5. The total area of the openings 87 in the smaller ring 80 is preferably such as to permit introduction of fuel at a rate which may produce a mixture of the desired effective richness or equivalence ratio over the effective area served by the inner ring 80. It will be appreciated that fuel injected at the ring 80 may be ignited and kept burning by means of the flare 20' and that combustion of such fuel may substantially take place before any substantial quantity of unburned fuel may be leaned by mixture with air outside said effective area. In like manner, the total area of the openings 88 in the intermediate ring 81 is preferably such as to provide the desired rate of fuel flow for efficient combustion in the area served by the ring 81, whenever the port in the fuel-metering valve controlling supply of fuel to the ring 81 is wide open. Also, the total area of openings 89 in the large fuel-injector ring 82 are preferably such as to produce the desired rate of fuel flow in the zone served by the ring 82.

A better understanding of the operation of a ram-jet engine incorporating the above-described principles may be had from a description of an illustrative case. Let it be assumed that the cross-sectional area of the combustion chamber is one square foot (13.6 inches diameter) and that only the central 53.4 per cent of air (assuming unidimensional flow) is utilized for combustion at a selected thrust coefficient of 0.5. This requires a burning area 9.9 inches in diameter, so as to leave an outer annulus of unburnt area 1.9 inches thick. Let it also be assumed that the diffuser expansion ratio is 2.5:1.

At the selected thrust coefficient (0.5), and proceeding at the desired supersonic speed, the shock is on the rim (inlet 15) when the combustion chamber is operating at a given specific impulse; the particular specific impulse will, for illustrative purposes, merely be given the identification number 130. The air-weight flow under these conditions is 83.3 pounds per second. With a uniform mixture typical of good burning of hydrocarbons, the required specific inpulse (130) is obtained at a richness or equivalence ratio of 0.735.

If the burning should proceed uniformly over the entire cross-section of the combustion chamber (as has been customary), the combustion efficiency is about 56 per cent; the hourly fuel requirement is 14,470 pounds; and the specific fuel consumption is 5.15 pounds of fuel per pound of thrust per hour. Theoretically, a suitable hydrocarbon fuel, such as pentane, should give the desired specific impulse (130) at a richnes or equivalence ratio of 0.415, thereby leading to an hourly fuel requirement of 8150 pounds and to a specific fuel consumption of 2.75 (lbs. fuel/lb. thrust/hr.). However, the best combustion efficiency that can actually be obtained is 88 per cent at a richness or equivalence ratio of 0.875 (where normally the specific impulse is 160 and the thrust coefficient is 0.685).

By utilizing the construction of the present invention and by burning at the best obtainable combustion efficiency of 88 per cent with an equivalence ratio of 0.875 in a centrally localized area (53 per cent of the air, as in the space wholly contained within shroud 19), the apparent overall richness or equivalence ratio is very substantially reduced, and the resulting hourly fuel requirement is 9260 pounds, with a specific fuel consumption of 3.12 (lbs. fuel/lb. thrust/hr.). This represents a 65 per cent improvement in fuel economy over uniform burning, with the same thrust coefficient being produced in each case (e. g. to produce the same cruising thrust). In addition, it will be apparent that by confining the burning within a structure spaced from the wall of the combustion chamber other advantages result, in producing a cooler and therefore longer-lasting combustion chamber and in making possible a shorter combustion chamber. Also, by confining the burning to a cross-sectional area smaller than the total cross-sectional area of the combustion chamber smoother burning is promoted.

It will be seen that there has been described improved means for operating a ram-jet engine. These improvements may result in very substantial savings of fuel requirements and also in longer life of the components. Even though a substantially constant thrust may be produced by the burning in any one of the combustion zones, it will be understood that the improved means make possible a ready response to the demand for changing thrust as by cutting in or cutting out combustion in one or more zones of combustion. It will be appreciated that these improved results and effects may be obtained with a system that is automatic in response to any desired thrust-anticipating means.

While the invention has been described in detail for the preferred forms shown, it will be understood that modifications may be made within the scope of the invention as defined in the appended claims.

It is claimed:

1. In a ram-jet, a tubular combustion chamber, a tubular shroud to entrain part of the air flow in said combustion chamber, said shroud being disposed within said combustion chamber and spaced from the inner wall thereof, first fuel-injection means disposed to inject fuel substantially only within said shroud, second fuel-injection means disposed to inject fuel substantially only in the space between said shroud and the inner wall of said combustion chamber, and metering means regulating the supply of fuel to one of said fuel injection means to the exclusion of the other.

2. In a ram-jet, an inlet, an outlet, and a combustion chamber therebetween, first fuel-injection means effective to inject fuel over a first fractional cross-sectional area of said combustion chamber, second fuel-injection means effective to inject fuel over a second fractional area of said combustion chamber, fuel-metering means constantly supplying fuel to said first fuel-injection means, said fuel-metering means including means responsive to a need for added thrust, said fuel-metering means including means supplying fuel to said second fuel-injection means upon a detected need for additional thrust.

3. In a ram-jet, an inlet, an outlet, and a combustion chamber therebetween, first fuel-injection means effective to inject fuel over a first fractional cross-sectional area of said combustion chamber, second fuel-injection means effective to inject fuel over a second fractional area of said combustion chamber, fuel-metering means for supplying fuel to both said fuel-injection means, said fuel-metering means including means responsive to a need for reduced thrust, said fuel-metering means including means reducing the supply of fuel to said second fuel-injection means upon a detected need for reduced thrust.

References Cited in the file of this patent

UNITED STATES PATENTS

| | | |
|---|---|---|
| 980,801 | Kraus | Jan. 3, 1911 |
| 1,879,187 | Goddard | Sept. 27, 1932 |
| 1,988,456 | Lysholm | Jan. 22, 1935 |
| 2,073,072 | Pontow et al. | Mar. 9, 1937 |
| 2,410,538 | Walton | Nov. 5, 1946 |
| 2,419,866 | Wilson | Apr. 29, 1947 |
| 2,508,420 | Redding | May 23, 1950 |
| 2,566,319 | Deacon | Sept. 4, 1951 |
| 2,667,741 | Price | Feb. 2, 1954 |